United States Patent
Nishimura

(10) Patent No.: US 7,595,807 B2
(45) Date of Patent: Sep. 29, 2009

(54) COLOR PROCESSING METHOD AND ITS APPARATUS

(75) Inventor: Naoki Nishimura, Ohtsu (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 11/272,725

(22) Filed: Nov. 15, 2005

(65) Prior Publication Data

US 2006/0114483 A1    Jun. 1, 2006

(30) Foreign Application Priority Data

Nov. 15, 2004   (JP) .............................. 2004-331113

(51) Int. Cl.
G09G 5/02    (2006.01)
G03F 3/08    (2006.01)
G06K 9/00    (2006.01)

(52) U.S. Cl. ........................ 345/590; 345/589; 345/604; 358/518; 382/162; 382/167

(58) Field of Classification Search ......... 345/589–591, 345/604; 358/518–520, 525; 382/162, 167
See application file for complete search history.

(56) References Cited

U.S. PATENT DOCUMENTS 6,556,198 B1   4/2003   Nishikawa ................. 345/420

| | | | |
|---|---|---|---|
| 2002/0031258 A1 | 3/2002 | Namikata | 382/165 |
| 2002/0101456 A1 | 8/2002 | Matsuoka | 715/848 |
| 2004/0061881 A1* | 4/2004 | Shimizu et al. | 358/1.9 |
| 2004/0120573 A1 | 6/2004 | Nishimura | 382/162 |

FOREIGN PATENT DOCUMENTS

JP    2002-094812 A    3/2002

* cited by examiner

Primary Examiner—Kimbinh T. Nguyen
Assistant Examiner—Tize Ma
(74) Attorney, Agent, or Firm—Fitzpatrick, Cella, Harper & Scinto

(57) ABSTRACT

A method (for, e.g., proof) of mapping only colors which fall outside a color gamut on its boundary calculates color differences from all the points in the color gamut, and determines a mapping destination by interpolating points with smaller color differences. For this reason, as the number of points that express the device color gamut increases, a mapping destination search requires longer time. Hence, calorimetric values indicating the color gamut of an output device are obtained, information indicating the boundary of the color gamut is generated based on the calorimetric values, and it is determined whether a color signal falls outside the color gamut. The color signal which falls outside the color gamut is mapped on the boundary on the basis of the information indicating the boundary of the color gamut.

6 Claims, 5 Drawing Sheets

COLOR PROCESSING METHOD AND ITS APPARATUS

FIELD OF THE INVENTION

The present invention relates to a color processing method and its apparatus and, more particularly, to color processing for mapping a color signal onto a device color gamut.

BACKGROUND OF THE INVENTION

As a device for outputting a color image, a monitor and hard copy device such as a printer, and the like are available. The monitor reproduces colors by an RGB additive process, and the hard copy device reproduces colors by a CMYK subtractive process. In general, the color gamut of the monitor is broader than that of the hard copy device, and a color image displayed on the monitor cannot be faithfully reproduced by the hard copy device.

As a technique for attaining visual tint matching, gamut mapping is available. The following various methods are known as the gamut mapping:

(1) a method of linearly mapping the input color gamut within the output color gamut;

(2) a method of mapping only colors outside the output color gamut on the gamut boundary of the output color gamut; and (3) a method of mapping colors outside the output color gamut on its high-saturation area to maintain a tone character.

Method (1) does not lose the tone character since it maps linearly, but visually different colors may be reproduced. Method (2) is used when calorimetric color matching is required (e.g., for proof). However, two points outside the output color gamut may often be mapped at the same position on the boundary of the color gamut, thus losing the tone character and losing information of an image. Method (3) can minimize the sense of discomfort in terms of the human sense of vision, and is used to output photos and the like, since the tone character or an input image is maintained and original colors of a low-saturation area are preserved.

In method (2), in order to search for the location of the closest point in a device color gamut, color differences of all points are calculated, and a mapping destination is determined by interpolating (closer) points with smaller color differences. For this reason, as the number of points that express the device color gamut increases, mapping destination search requires longer time (described in, e.g., Japanese Patent Laid-Open No. 2002-094812 or USPAP 2002-031258).

SUMMARY OF THE INVENTION

The first aspect of the present invention discloses a method of mapping a color to be mapped onto a color gamut, comprising the steps of: obtaining information indicating a polyhedron which indicates a predetermined color gamut and is defined by a plurality of polygons; determining a positional relationship between the color to be mapped and the polyhedron; and searching, when it is determined as a result of the determining step that the color to be mapped falls outside the polyhedron, the plurality of polygons which define the polyhedron for a polygon close to the color to be mapped, and mapping the color to be mapped on the found polygon.

The second aspect of the present invention discloses a method of mapping a color signal onto a color gamut, comprising the steps of: obtaining calorimetric values indicating a color gamut of an output device; generating information indicating a boundary of the color gamut from the calorimetric values; determining whether or not the color signal falls outside the color gamut; and mapping the color signal which falls outside the color gamut on the boundary on the basis of the information indicating the boundary of the color gamut.

According to the present invention, upon mapping a color to be mapped on the boundary of the color gamut, a mapping destination can be quickly searched for and found.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Image processing according to the preferred embodiment of the present invention will be described in detail hereinafter.

Figure 1:
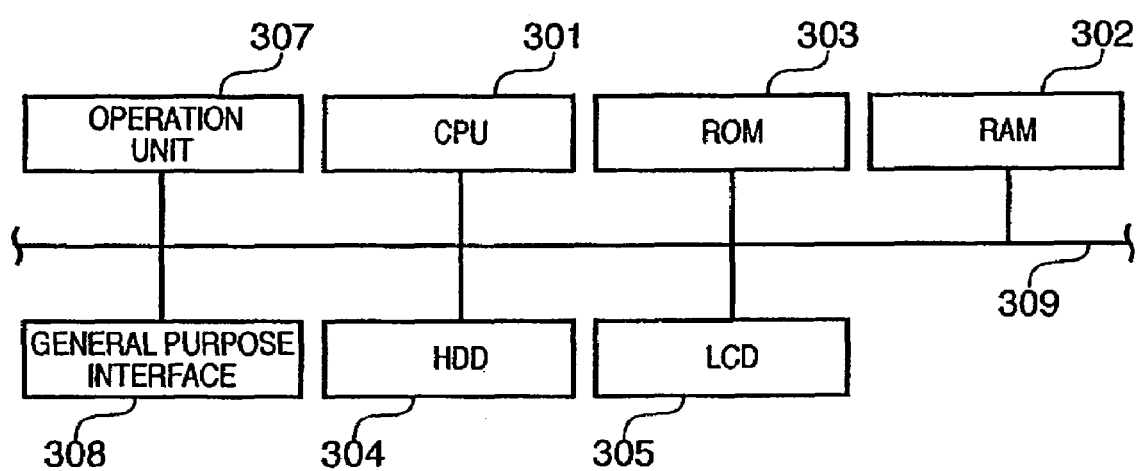
FIG. 1 is a block diagram showing the arrangement of an image processing apparatus according to an embodiment of the present invention.

FIG. 1 is a block diagram showing the arrangement of an image processing apparatus of this embodiment. The image processing apparatus of this embodiment can be implemented by supplying image processing software or the like to a general-purpose personal computer.

A CPU 301 executes various programs such as an operating system (OS), application software, and the like stored in a ROM 303 and hard disk drive (HDD) 304 using a RAM 302 as a work memory. The CPU 301 controls respective components connected to a system bus 309. Note that image processing to be described later is also executed by the CPU 301.

A liquid crystal display (LCD) 305 is a monitor which displays a user interface window, and the states and results of various kinds of processing including input and output images. An operation unit 307 includes, e.g., a keyboard and pointing device such as a mouse or the like, and is used by the user to input commands and data to the image processing apparatus. A general-purpose interface 308 comprises a serial interface such as USB (Universal Serial Bus), IEEE1394, or the like, a parallel interface such as SCSI, GPIB, IEEE1284, PC card bus, or the like, or a serial interface such as RS232C, RS422, or the like (a combination of a plurality of interfaces is also available) The general-purpose interface 308 can connect input devices such as a calorimeter, image scanner, film scanner, digital camera, video camera, and the like, and output devices such as a printer and the like.

Note that interfaces are present between the system bus 309 and the HDD 304, LCD 305, and operation unit 307, respectively (although not shown in FIG. 1).

The HDD 304 stores drivers (software) of various input/output devices to be connected to the general-purpose interface 308, and provides an interface function between the CPU 301 and input/output devices.

Figure 2:
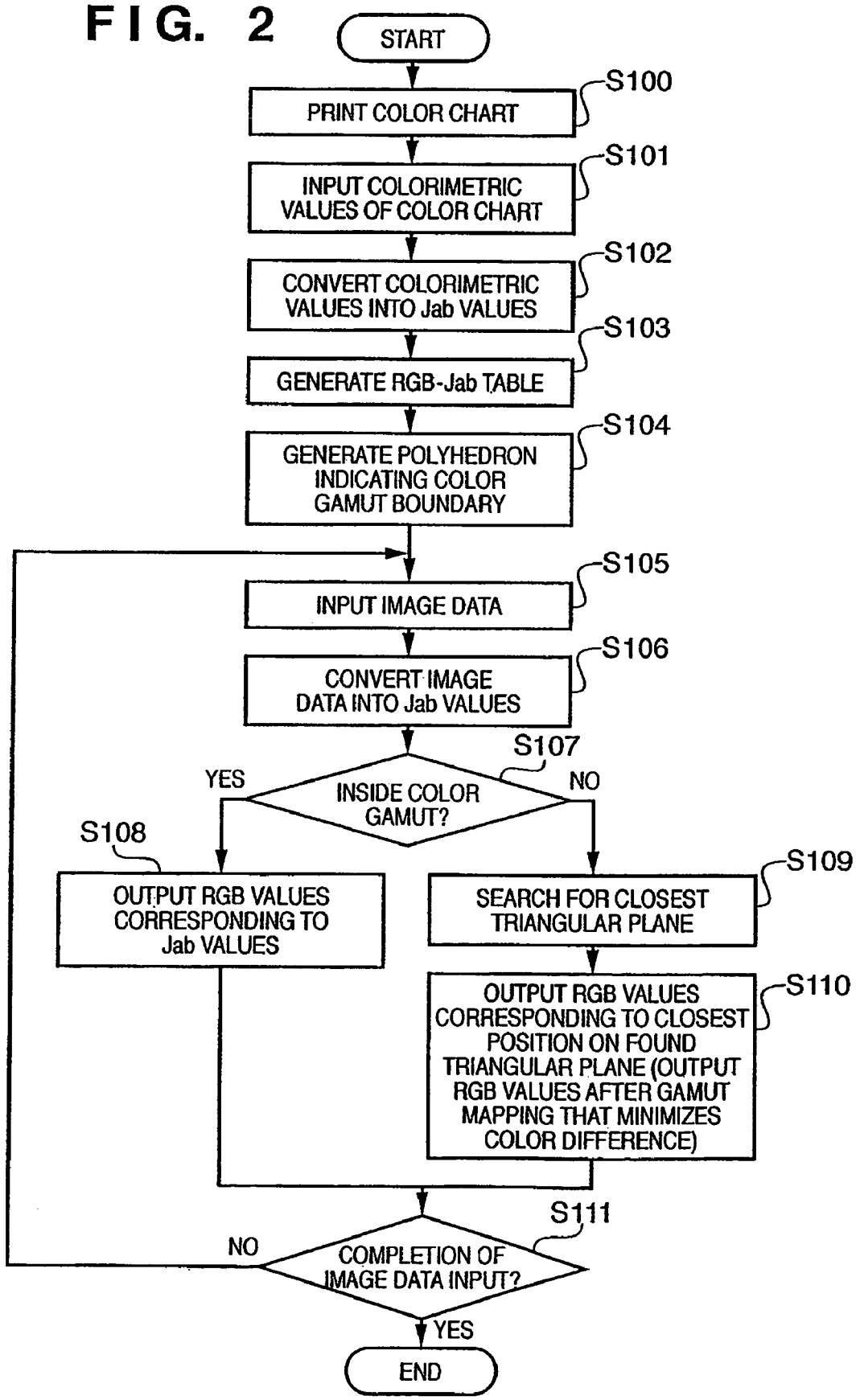
FIG. 2 is a flowchart showing the image processing according to the embodiment of FIG. 1.

FIG. 2 is a flowchart showing the image processing of this embodiment, which is executed by the CPU 301.

Patch data are output to an output device such as a printer or the like connected to the general-purpose interface 308 to print a color chart (S100), and calorimetric values of the color chart are input from a calorimeter connected to the general-purpose interface 308 (S101). The calorimetric values indicating the reproduction characteristic of the output device obtained in step S101 are converted into Jab values in consideration of the observation condition using a CIECAM97 model (S102). Then, a three-dimensional (3D) RGB-Jab table indicating the relationship between the patch data (device RGB values) and Jab values is created (S103). Note that the observation condition may be added in the calorimetric values, or a user interface may be displayed on the LCD 305 to prompt the user to input it from the operation unit 307.

Figure 3:
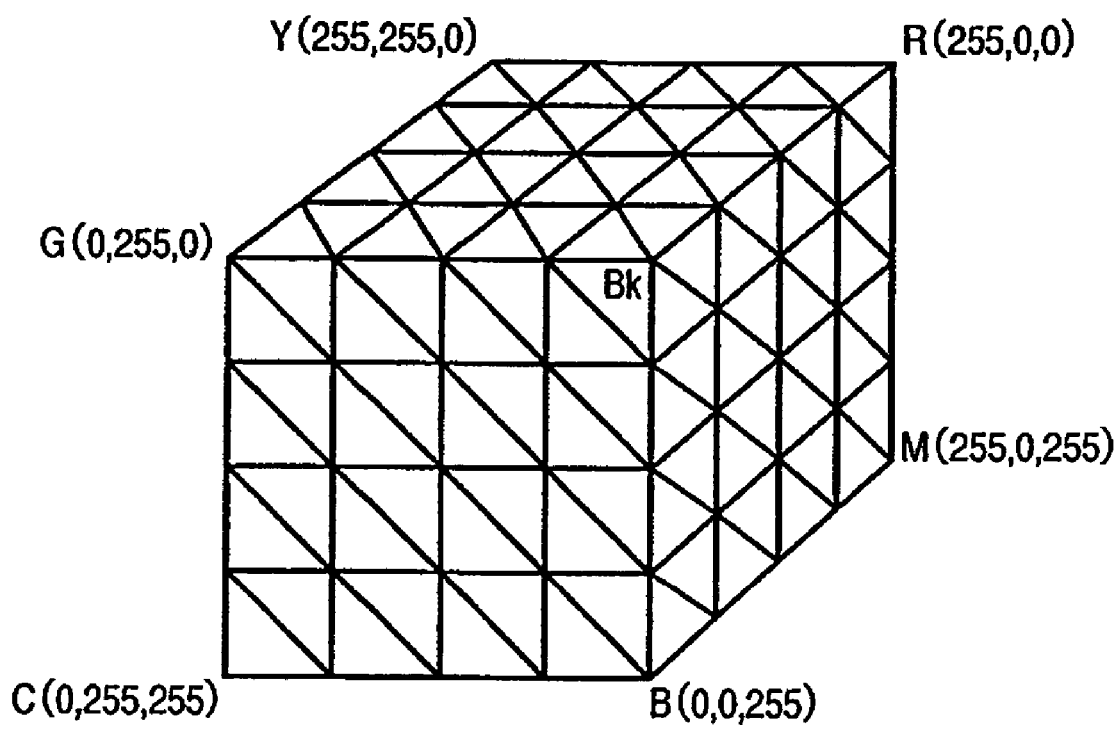
FIG. 3 shows the RGB cube of an RGB-Jab table.

FIG. 3 shows an example of the RGB cube of the RGB-Jab table, i.e., a 5×5×5 3D table having grid values=0, 64, 128, 192, and 255. In this embodiment, only grid points on the surfaces of the RGB cube are extracted based on a device RGB value of a grid point. A polyhedron is created based on a plurality of triangles (triangular planes) defined by Jab values corresponding to the extracted RGB values (S104). This polyhedron indicates a color gamut (boundary) of the output device. In the example of FIG. 3, since each surface of the cube has 4×4×2=32 triangles, the polyhedron is generated using a total of 32×6=192 triangles.

Then, image data is input from an external device via the general-purpose interface 308 (S105), and is converted into Jab values (S106). Then, inside/outside determination for determining whether the Jab values fall inside or outside the color gamut using the polyhedron is executed (S107). Note that the observation condition may be added to the calorimetric values, or a user interface may be displayed on the LCD 305 to prompt the user to input it from the operation unit 307.

As a result of inside/outside determination, corresponding RGB values are output for the Jab values which are determined to fall inside the color gamut (S108). On the other hand, if the Jab values fall outside the color gamut, a closest triangle is searched for (S109), and RGB values corresponding to a position closest to the found triangle are output (S110), as will be described in detail later. Image data output in step S108 or S110 is temporarily stored in the RAM 302 or HDD 304 and is converted from RGB values into YMCK values of the output device, and the converted values are sent to the output device via the general-purpose interface 308.

It is checked if input of the image data is complete (S111). If image data to be input still remain, the processes in steps S105 to S109 are repeated. In case of an output device for which a polyhedron indicating the color gamut boundary has already been generated, the processing can start from step S105.

Figure 4:
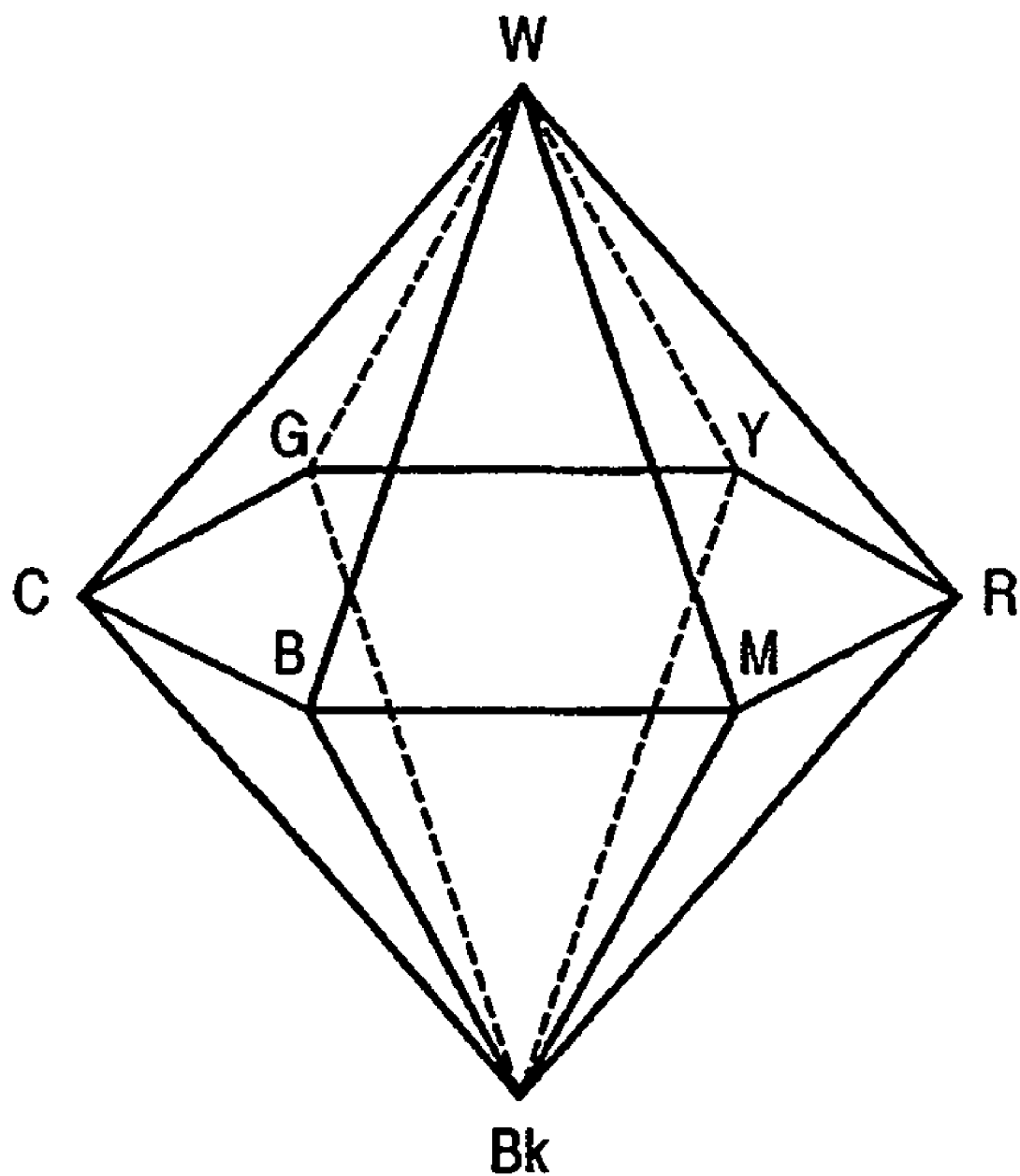
FIG. 4 shows an example of the simplest dodecahedron upon expressing the color gamut (boundary) of an output device using a plurality of triangles.

FIG. 4 shows an example of the simplest dodecahedron upon expressing the color gamut (boundary) of an output device using a plurality of triangles. A case will be explained below in which the color gamut (boundary) of the output device is expressed by the dodecahedron shown in FIG. 4 for the sake of simplicity. However, in practice, a polyhedron is generated using a convex hull (a minimum convex set including a group of points given by a real linear space) from a point set of patch data, or a polyhedron is generated using color signals corresponding to the surfaces of the RGB cube shown in FIG. 3.

Figure 5:
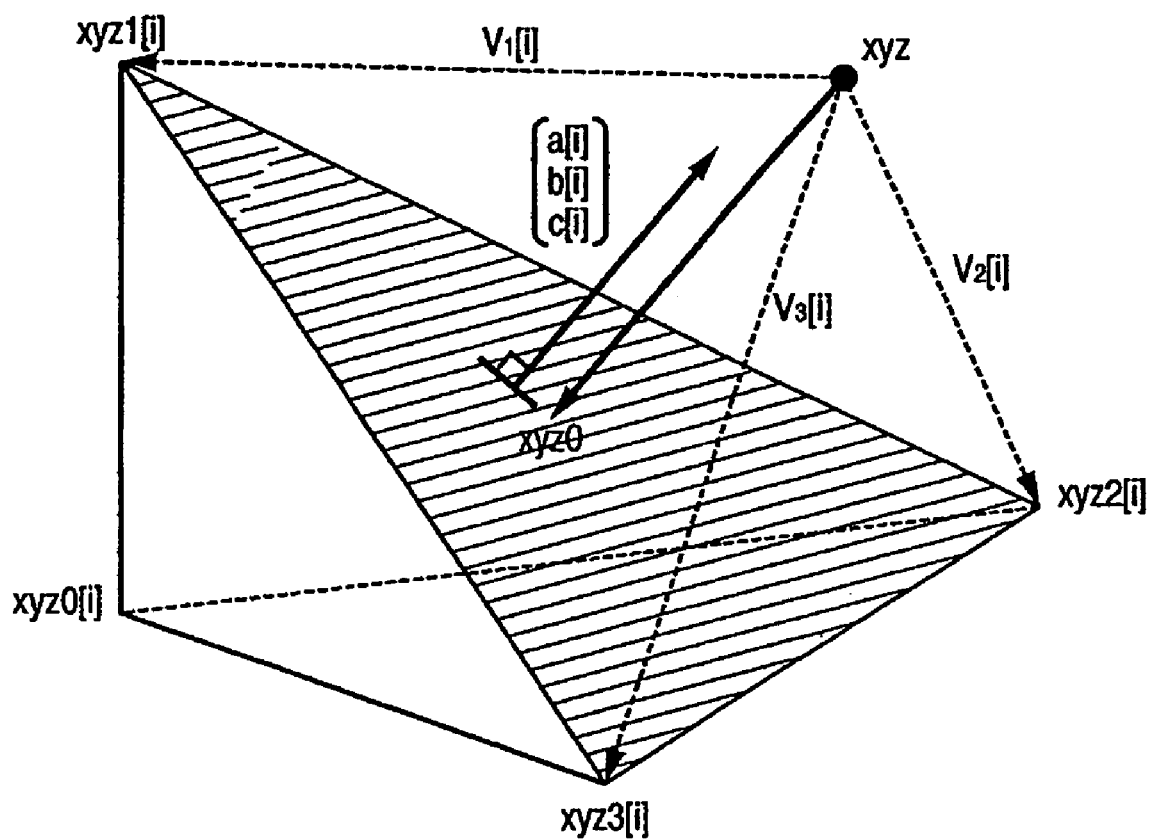
FIG. 5 is a view for explaining inside/outside determination of the color gamut of the output device.

In order to determine whether the input Jab values fall inside or outside the dodecahedron shown in FIG. 4, a normal vector $(a[i], b[i], c[i])$ to respective triangles, as shown in FIG. 5, is calculated. Note that i represents the index number of a triangle, and $0 \leq i \leq 11$ in the case of the dodecahedron shown in FIG. 4, or $0 \leq i \leq 191$ in the case of a 192-hedron shown in FIG. 3. In the following description, in order to three-dimensionally geometrize a Jab plane based on xyz, J≡x, a≡y, and b≡y.

A normal vector which passes through the a plane specified by three vertexes xyz1[i], xyz2[i], and xyz3[i] shown in FIG. 5 is expressed by:

$$(a[i], b[i], c[i]) = (xyz2[i] - xyz1[i]) \times (xyz3[i] - xyz1[i]) \quad (1)$$

An equation of the plane can be described by:

$$a[i]x + b[i]y + c[i]z + d[i] = 0 \quad (2)$$

When an arbitrary point xyz0 is set on the J-axis of the Jab coordinate system, a tetrahedron defined by four points xyz0, xyz1[i], xyz2[i], and xyz3[i] can be generated. Since the barycenter of this tetrahedron is a point $(xyz0 + xyz1[i] + xyz2[i] + xyz3[i])/4$ inside the color gamut, if the substitution result of the coordinates of this barycenter into equation (3) below assumes a positive value (e>0), it is determined that a positive sign indicates inside and a negative sign indicates outside; if the substitution result assumes a negative value (e<0), it is determined that a negative sign indicates inside and a positive sign indicates outside. By substituting the input Jab values into equation (3), inside/output determination is made based on the sign of the result, and this processing is repeated for all triangles (i.e., by incrementing index number i):

$$e = a[i]x + b[i]y + c[i]z + d[i] \quad (3)$$

It is determined that the Jab values which are determined to fall inside the tetrahedrons specified by all the triangles fall inside the color gamut. On the other hand, it is determined that the Jab value which are determined to fall outside at least one tetrahedron fall outside the color gamut (S106). The Jab values which are determined to fall inside the color gamut are output without gamut mapping. On the other hand, the Jab values which are determined to fall outside the color gamut undergo the following process to perform gamut mapping having a minimum color difference.

In FIG. 5, a vector V1[i] of a straight line which connects an input point xyz and the point xyz1[i], a vector V2[i] of a straight line which connects the input point xyz and point xyz2[i], and a vector V3[i] of a straight line which connects the input point xyz and point xyz3[i] are respectively defined by:

$$V1[i] = xyz1[i] - xyz \quad (4)$$

$$V2[i] = xyz2[i] - xyz \quad (5)$$

$$V3[i] = xyz3[i] - xyz \quad (6)$$

On the other hand, a vector V0 of a straight line that connects the input point xyz and a closest tangent point xyz0 on the plane has a relationship described by:

$$V0 = sV1[i] + tV2[i] + uV3[i] \quad (7)$$
$$= k(a[i]/m, b[i]/m, c[i]/m)$$
$$\text{for } m = \sqrt{(a[i]^2 + b[i]^2 + c[i]^2)}$$
$$s + t + u = 1$$

By defining:

$$Vj[i] = (Vj[i].x, Vj[i].y, Vj[i].z) \quad (8)$$

$$K = k/m \quad (9)$$

equation (7) can be rewritten as:

$$\begin{bmatrix} V1[i]x & V2[i]x & V3[i]x \\ V1[i]y & V2[i]y & V3[i]y \\ V1[i]z & V2[i]z & V3[i]z \end{bmatrix} \begin{bmatrix} s \\ t \\ u \end{bmatrix} = K \begin{bmatrix} a(i) \\ b(i) \\ c(i) \end{bmatrix} \quad (10)$$

$$\begin{bmatrix} s \\ t \\ u \end{bmatrix} = K \begin{bmatrix} V1[i]x & V2[i]x & V3[i]x \\ V1[i]y & V2[i]y & V3[i]y \\ V1[i]z & V2[i]z & V3[i]z \end{bmatrix}^{-1} \begin{bmatrix} a(i) \\ b(i) \\ c(i) \end{bmatrix} \quad (11)$$

Furthermore, by defining: (12)

s, t, and u can be calculated like:

$$\begin{bmatrix} V1[i]x & V2[i]x & V3[i]x \\ V1[i]y & V2[i]y & V3[i]y \\ V1[i]z & V2[i]z & V3[i]z \end{bmatrix}^{-1} = \begin{bmatrix} inv11[i] & inv12[i] & inv13[i] \\ inv21[i] & inv22[i] & inv23[i] \\ inv31[i] & inv32[i] & inv33[i] \end{bmatrix} \quad (12)$$

$$\begin{bmatrix} s \\ t \\ u \end{bmatrix} = K \begin{bmatrix} Inv11[i] & Inv12[i] & Inv13[i] \\ Inv21[i] & Inv22[i] & Inv23[i] \\ Inv31[i] & Inv32[i] & Inv33[i] \end{bmatrix}^{-1} \begin{bmatrix} a(i) \\ b(i) \\ c(i) \end{bmatrix} \quad (13)$$

Therefore, from s+t+u=1 of equation (7) and equation (9), K is given by:

$$K=m/(inv1[i]\cdot a[i]+inv2[i]\cdot b[i]+inv3[i]\cdot c[i]) \quad (14)$$

for $m=\sqrt{(a[i]^2+b[i]^2+c[i]^2)}$

Inv1[i]=Inv11[i]+Inv21[i]+Inv31[i]

Inv2[i]=Inv12[i]+Inv22[i]+Inv32[i]

Inv3[i]=Inv13[i]+Inv23[i]+Inv33[i]

With this method, K is calculated for triangles of i=0 to 11, and a triangle with index number i which has a minimum absolute value |K| is a triangle closest to the input point xyz. Using K with the minimum absolute value, the point xyz0 on the triangle closest to the input point xyz is calculated by:

$$\begin{bmatrix} xyz0.x \\ xyz0.y \\ xyz0.z \end{bmatrix} = \begin{bmatrix} xyz.x \\ xyz.y \\ xyz.z \end{bmatrix} + k \begin{bmatrix} a(i) \\ b(i) \\ c(i) \end{bmatrix} \quad (15)$$

The point xyz0 calculated by equation (15) is a point which is closest to the input point xyz, i.e., which has a minimum color difference, on the color gamut of the output device. This point is adopted as output RGB values after the gamut mapping that minimizes the color difference (that is, these values amount to RGB values corresponding to the position closest to the found triangle in step S108). In this manner, the input point xyz shown in FIG. 5 is converted into the point xyz0.

To sum, according to this embodiment, since the color gamut (boundary) of the output device is expressed by a polyhedron as a set of plural triangles, an input point without the output color gamut can be mapped to a closest point on the output color gamut (boundary) by calculating the distances between the input point and respective triangles. Therefore, a point group included in the entire color gamut of the output device need not be searched for a point closest to the input point. As a result, the search time of the mapping destination can be greatly reduced. Hence, a calorimetric close color can be reproduced in use purposes such as print simulation, proof, and the like.

Modification of Embodiment

In the above description, a case has been exemplified wherein the convex hull and RGB cube are used upon generating a polyhedron that expresses the color gamut (boundary) of the output device. However, any other methods may be used.

The output device can be hard copy devices which form an image such as a laser beam printer, ink-jet printer, thermal transfer or sublimation printer, or the like, a display device such as a monitor, or the like as long as it outputs an image.

In the above embodiment, a case has been explained wherein the input color signal is mapped on the color gamut of the output device. Also, the present invention can be applied to mapping on other color gamuts such as that of an sRGB color space and the like in place of the color gamut of the output device.

In place of externally inputting a Jab color signal, a color signal may be input from an image reader of the apparatus itself. In this case, the present invention is not limited to Jab values, but signals of other color spaces such as Lab values, Luv values, YIQ values, and the like may be adopted.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-331113, filed on Nov. 15, 2004, which is hereby incorporated by reference herein.

What is claimed is:

1. A method of mapping a color to be mapped into a color gamut, comprising the steps of:
   obtaining, from a memory, information indicating a polyhedron which indicates the color gamut and is defined by a plurality of polygons;
   determining whether or not the color to be mapped falls outside the polyhedron;
   searching the plurality of polygons which define the polyhedron for a polygon close to the color to be mapped; and
   mapping the color to be mapped to a closest point on the searched polygon,
   wherein the searching step and the mapping step are executed when it is determined as a result of the determining step that the color to be mapped falls outside the polyhedron,
   wherein in the determining step, calculation of a barycenter of the polyhedron defined by a predetermined point in the color gamut and a polygon which defines the polyhedron, and determination whether or not the color to be mapped and the barycenter are located at the same side of the polygon, are executed in each of the plurality of polygons which define the polyhedron,
   wherein in the searching step, calculation of a distance between the color to be mapped and each of the plurality of polygons which define the polyhedron, and decision that the polygon corresponding to the shortest distance is the searched polygon, are executed, and
   wherein the distance is calculated from a normal of the polygon, and vectors defined by the color to be mapped and vertices of the polygon.

2. The method according to claim 1, wherein the obtaining step comprises the steps of:
   obtaining a plurality of colorimetric values indicating a character of a device as the color gamut; and
   generating the information indicating the polyhedron which is defined by the plurality of polygons from the plurality of colorimetric values.

3. The method according to claim 2, wherein the plurality of polygons are triangles.

4. The method according to claim 2, further comprising the step of generating the information indicating a boundary of the color gamut from colorimetric values corresponding to respective surfaces of a hexahedron of device RGB values corresponding to the plurality of colorimetric values.

5. The method according to claim 1, wherein the color to be mapped which falls inside the color gamut does not undergo the mapping.

6. A computer-readable storage medium storing a computer-executable program for causing a computer to perform a method of mapping a color to be mapped into a color gamut, the method comprising the steps of:
   obtaining information indicating a polyhedron which indicates the color gamut and is defined by a plurality of polygons;
   determining whether or not the color to be mapped falls outside the polyhedron;
   searching the plurality of polygons which define the polyhedron for a polygon close to the color to be mapped; and
   mapping the color to be mapped to a closest point on the searched polygon,
   wherein the searching step and the mapping step are executed when it is determined as a result of the determining step that the color to be mapped falls outside the polyhedron,
   wherein in the determining step, calculation of a barycenter of the polyhedron defined by a predetermined point in the color gamut and a polygon which defines the polyhedron, and determination whether or not the color to be mapped and the barycenter are located at the same side of the polygon, are executed in each of the plurality of polygons which define the polyhedron,
   wherein in the searching step, calculation of a distance between the color to be mapped and each of the plurality of polygons which define the polyhedron, and decision that the polygon corresponding to the shortest distance is the searched polygon, are executed, and
   wherein the distance is calculated from a normal of the polygon, and vectors defined by the color to be mapped and vertices of the polygon.

* * * * *